United States Patent Office 3,013,044
Patented Dec. 12, 1961

3,013,044
BIS-ARYLOXYPHENYL-DIALKYLSILANES
Wilhelm J. Schnabel, Columbus, Ohio, assignor to Olin Mathieson Chemical Corporation, a corporation of Virginia
No Drawing. Filed June 5, 1959, Ser. No. 818,270
5 Claims. (Cl. 260—448.2)

This invention relates to novel bis-aryloxphenyl-dialkylsilanes which are useful as high temperature resistant fluids and lubricants.

The novel compounds of this invention have the general formula:

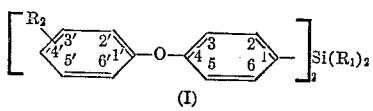
(I)

wherein $R_1$ is an alkyl radical and $R_2$ is hydrogen or an alkyl radical. The useful alkyl radicals contain not more than 5 carbon atoms, such as methyl, ethyl, n-propyl, iso-propyl, butyl and amyl.

Phenoxyphenyl phenylsilanes are known and have been prepared from phenylchlorosilanes and lithium compounds of diphenyl ethers. These compounds are reported to be thermally stable, however, their melting points are rather high thus, excluding their use as fluids or lubricants. Tetrakis-(4-phenoxyphenyl)-silane, for example, melts at 206° C. while bis-(4-phenoxyphenyl)-diphenylsilane has a melting point of 163° C. Shifting the phenoxy group from the para-position to the ortho-position does not change the melting point appreciably as evidenced by the fact that bis-(2-phenoxyphenyl)-diphenylsilane melts at 164°–165° C.

It has been found that the preparation of compounds of the general Formula I in which $R_2$ is an alkyl radical leads to products which are liquids below room temperature. They are characterized by an unusually wide liquid range in that they have boiling points of from 485° to about 540° C. In addition, the novel compounds exhibit excellent thermal stability combined with hydrolytic stability. These properties make such compounds extremely valuable as high temperature resistant fluids suitable for use as hydraulic fluids and as lubricants for high speed aircraft.

Compounds of the general Formula I in which $R_2$ is hydrogen, for example, bis-(4-phenoxyphenyl)-dimethylsilane and bis-(4-phenoxyphenyl)-diethylsilane have rather low melting points (68°–69° C. and 55°–56° C. respectively). Although melting points in this range exclude the use of such compounds for such applications as hydraulic fluids or as lubricants, it has been found that by mixing bis-(4-phenoxyphenyl)-dimethylsilane with bis-(4-phenoxyphenyl)-diethylsilane in a ratio of approximately 1:1 by weight, a liquid which does not crystallize at room temperature is obtained. Such a liquid mixture with its wide liquid range has utility as a high temperature resistant fluid or lubricant.

The introduction of short chain alkyl groups into compounds of Formula I, that is where $R_2$ is, for example, methyl or ethyl, increases the liquid range considerably. All attempts to obtain such compounds in a crystalline state have been unsuccessful. They are liquids with pour points below 0° C.

The novel compounds of this invention have a prevailing aromatic character and have a very low aliphatic-bound hydrogen content, for example, in bis-(-4-phenoxyphenyl)-dimethylsilane the hydrogen of the methyl groups constitutes only 1.53 percent of the total molecular weight, which is advantageous with regard to oxidation and thermal stability. The thermal stability was tested by heating these new compounds for five hours at 700° F. and in most cases the weight loss observed was between 0.2 and 0.5 percent. Even with prolonged heating at this temperature, carbonization products were not produced; only very slight color changes from colorless to a very faint yellow were observed. Viscosity and refractive indices were unchanged after the heating.

The novel bis-aryloxyphenyl-dialkylsilanes of this invention can be prepared by reacting a dichlorodialkylsilane and a halophenyl aryl ether with an alkali metal in the presence of an inert solvent according the following equation:

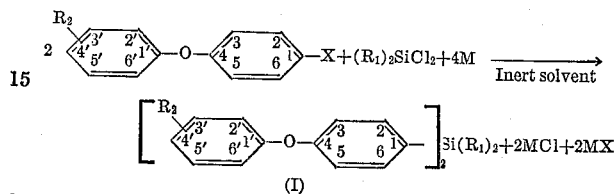
(I)

wherein $R_1$ and $R_2$ have the meanings described above X is a halogen selected from the group consisting of chlorine, bromine and iodine and M is an alkali metal. Useful inert solvents include such aromatic solvents as benzene, toluene, and xylene and the lower dialkyl ethers, such as ethyl ether, n-propyl ether, and iso-butyl ether. Dichlorodialkylsilanes which fall within the scope of this invention include, for example, dimethyldichlorosilane, diethyldichlorosilane, dipropyldichlorosilane, and dibutyldichlorosilane. Suitable halophenyl aryl ethers, are, for example, p-bromophenyl phenyl ether, p-bromophenyl phenyl ether, p-bromophenyl m-tolyl ether, p-bromophenyl-m-ethylphenyl ether, p-bromophenyl o-methylphenyl ether, p-bromophenyl m-propylphenyl ether and the corresponding chlorine and iodine derivatives. The reaction temperature may be varied widely from about room temperature to about 150° C.

Halophenyl aryl ethers of the general formula:

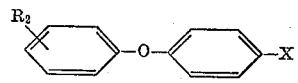

wherein $R_2$ is hydrogen or an alkyl radical containing from 1 to 5 carbon atoms and X is a halogen selected from the group consisting of chlorine, bromine and iodine can be prepared by reacting equivalent amounts of a p-dihalobenzene and an alkylated phenol in the presence of potassium hydroxide and catalytic amounts of copper according to the method of Krause, E., and Weinberg, K., Ber. 62, 2223 (1925). The reaction proceeds as follows:

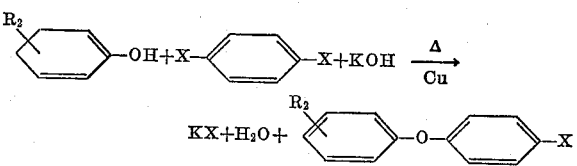

The following examples illustrate specific embodiments of this invention.

EXAMPLE I

*Bis-(4-phenoxyphenyl)-dimethylsilane*

Sodium sand (36.8 g., 1.6 gram atoms), prepared by stirring metallic sodium in 500 milliliters of xylene at reflux temperature under a blanket of nitrogen, was dispersed in 750 milliliters of ethyl ether. A mixture of dimethyldichlorosilane (46.4 grams, 0.36 mole) and p-bromophenyl phenyl ether (199.2 grams, 0.8 mole), dissolved in 100 milliliters of ethyl ether, was added dropwise with continuous stirring and at rate sufficient to maintain gentle reflux. Catalytic amounts of ethylacetate and iodine (approx. 0.1 gram of each) were used to initiate the reaction. The reaction mixture was stirred under reflux for 48 hours and then stirred for additional 48 hours at room temperature at which time most of the sodium had reacted. Unreacted sodium was eliminated by adding a small amount of ethanol. The formed sodium salts were removed by filtration and the ether was evaporated. Fractional distillation gave 112 grams (78.5 percent of the theoretical quantity) of bis-(4-phenoxyphenyl)-dimethylsilane, a colorless liquid, boiling at 220°–223° C. at 0.25 mm. Hg (corresponding approx. to 490° C. or 915° F. at normal pressure), $n_D^{23}$:1.6112.

Calcd. for $C_{26}H_{24}SiO_2$: C, 78.75; H, 6.10; Si, 7.07. Found: C, 78.65, 78.55; H, 6.05, 6.29; Si, 7.10, 7.18.

Kinematic viscosity:

| 100° F. | 210° F. |
|---|---|
| 146.67 centistokes. | 8.34 centistokes. |
| ASTM slope | 0.1 |

The oily bis-(4-phenoxyphenyl)-dimethylsilane crystallized after standing for several weeks at room temperature. After recrystallization from Skellysolve F, the melting point was 68°–69° C.

The thermal stability of bis-(4-phenoxyphenyl-dimethylsilane was tested by heating a sample of 10.1896 grams for five hours at 700° F. A weight loss of 0.0251 gram (0.25 percent) was found. The refractive index was unchanged and the compound showed only a very slight change in color after heating.

EXAMPLE II

Bis-(4-phenoxyphenyl)-diethylsilane

Sodium ribbon cut into small pieces (18.4 grams, 0.8 gram atom) was dispersed in 400 milliliters of ethyl ether. A mixture of diethydichlorosilane (28.3 grams, 0.18 mole) and p-bromophenyl phenyl ether (99.6 grams, 0.4 mole), dissolved in 100 milliliters of ethyl ether, was added dropwise with vigorous stirring at a rate to maintain gentle reflux. The exothermic reaction was initiated by a few drops of ethylacetate and a small iodine crystal. The reaction mixture was stirred at room temperature for 72 hours and then refluxed for 24 hours. A small amount of ethanol was added and the formed sodium salts were dissolved in 300 milliliters of water. The ether layer was separated, dried over sodium sulfate, and fractionally distilled. The main fraction was redistilled to give 45.5 grams (59.5 percent of the theoretical quantity) of bis-(4-phenoxyphenyl)-diethylsilane, a colorless liquid, boiling at 250°–255° C. at 0.7 mm. Hg (corresponding to approx. 500° C. or 930° F. at normal pressure), $n_D^{27}$:1.6048.

Calcd. for $C_{28}H_{28}SiO_2$: C, 79.20; H, 6.65; Si, 6.61. Found: C, 79.24; H, 6.64; Si, 6.49.

The oily liquid crystallized partially after standing for two weeks at room temperature. Recrystallization of the separated crystals from ethanol gave crystals melting at 55°–56° C.

The thermal stability was tested by heating a sample of 10.6840 grams for five hours at 700° F. A weight loss of 0.0521 gram (0.49 percent) was found. As a result of this treatment, the compound showed only a very slight change in color and the refractive index was unchanged.

EXAMPLE III p-Bromophenyl m-tolyl ether p-Dibromobenzene (236 grams, 1.0 mole), m-cresol (108 grams, 1.0 mole), and copper powder (3.0 grams) were placed in a 1000 ml. flask equipped with stirrer and a reflux condenser with connected water trap. The mixture was heated at 205° C. oil bath temperature and potassium hydroxide (65 g. of a commercial product with 86 percent KOH, 1.0 mole) was added over a period of four hours. A total of 25.0 milliliters of water was collected. The mixture was then stirred for eight hours at an oil bath temperature of 240°–250° C. After cooling, the mixture was treated with 1000 milliliters of water and the organic layer was extracted with ether and dried. Fractional distillation gave 146.5 grams (55.7 percent of the theoretical quantity) of p-bromophenyl m-tolyl ether, a colorless liquid, boiling at 184°–186° C. (16 mm. Hg), $n_D^{27}$:1.5965.

Calcd. for $C_{13}H_{11}OBr$: Br, 30.37. Found: Br, 30.23.

EXAMPLE IV

Bis-[4-(3'-methylphenoxy)-phenyl]-dimethylsilane p-Bromophenyl m-totyl ether (105.2 grams, 0.4 mole) and dimethylchlorosilane (23.2 grams, 0.18 mole) were reacted with metallic sodium (18.4 grams, 0.8 gram atom) in the same manner as described in Example II for the preparation of bis - (4-phenoxyphenyl) - diethylsilane. Fractional distillation of the reaction product gave 47.1 grams (61.5 percent of the theoretical quantity) of bis-[4-(3'-methylphenoxy)-phenyl] - dimethylsilane, a colorless liquid, boiling at 240°–260° C. at 0.5 mm. Hg (corresponding to approx. 500° C. or 930° F. at normal pressure), $n_D^{30}$:1.5991.

Calcd. for $C_{28}H_{28}SiO_2$: C, 79.20; H, 6.65; Si, 6.61. Found: C, 78.91; H, 6.58; Si, 6.36.

Kinematic viscosity:

| 100° F. | 210° F. |
|---|---|
| 315.07 centistokes. | 10.34 centistokes. |
| ASTM slope | 0.95 |

To test thermal stability of the compound a sample (11.3212 grams) was heated for five hours at 700° F. A weight loss of 0.0242 gram (0.21 percent) was found. The compound showed only a very slight change in color after heating and the refractive index was unchanged.

EXAMPLE V

Bis-[4-(3'methylphenoxy)-phenyl]-diethylsilane p-Bromophenyl m-tolyl ether (105.2 grams, 0.4 mole) and diethyldichlorosilane (28.3 grams, 0.18 mole) were reacted wtih metallic sodium (18.4 grams, 0.8 gram atom) in the same manner as described in Example II for the preparation of bis-(4-phenoxyphenyl)-diethylsilane. Fractional distillation of the reaction product gave 43.1 grams (52.9 percent of the theoretical quantity) of bis- [4-(3'-methylphenoxy)-phenyl] -diethylsilane, a colorless liquid, boiling at 250°–255° C. at 0.3 mm. Hg (corresponding to approx. 520° C. or 970° F. at normal pressure), $n_D^{26}$:1.5977.

Calcd. for $C_{30}H_{32}SiO_2$: C, 79.60; H, 7.13; Si, 6.20. Found: C, 79.44; H, 6.96; Si, 6.10.

Kinematic viscosity:

| 100° F. | 210° F. |
|---|---|
| 334.0 centistokes. | 12.50 centistokes. |
| ASTM slope | 0.90 |

The thermal stability was tested by heating a sample of 8.1727 grams for five hours at 700° F. A weight loss of 0.0401 gram (0.49 percent) was found. After this treatment, the compound showed only a very slight change in color and the refractive index was unchanged.

EXAMPLE VI p-Bromophenyl o-tolyl ether p-Bromophenyl o-tolyl ether was prepared from p-dibromobenzene (236 grams, 1.0 mole), o-cresol (108 grams, 1.0 mole), and potassium hydroxide (65 grams of a commercial product with 86 percent KOH, 1.0 mole) in the same manner as described in Example III for the preparation of p-bromophenyl m-tolyl ether. A total of 86 grams of p-bromophenyl o-tolyl ether, a colorless liquid (32.7 percent of the theoretical quantity), boiling at 174°–177° C. (13 mm. Hg) $n_D^{26}$:1.5963, was obtained.

EXAMPLE VII

*Bis-[4-(2'-methylphenoxy)-phenyl]-diethylsilane* p-Bromophenyl o-tolyl ether (105.2 grams, 0.4 mole) and diethyldichlorosilane (28.3 grams, 0.18 mole) were reacted wtih metallic sodium (18.4 grams, 0.8 gram atom) were reacted with metallic sodium (18.4 grams, 0.8 mole) in the same manner as described in Example II for the preparation of bis(4-phenoxyphenyl)-diethylsilane. Fractional distillation of the reaction product gave 34.0 grams (41.7 percent of the theoretical quantity) of bis-[4-(2'-methylphenoxy)-phenyl]-diethylsilane, a colorless liquid, boiling at 250°–251° C. at 0.3 mm. Hg (corresponding to approx. 520° C. or 970° F. at normal pressure) $n_D^{27}$: 1.5957.

Calcd. for $C_{30}H_{32}SiO_2$: C, 79.60; H, 7.13; Si, 6.20. Found: C, 78.64; H, 6.94; Si, 6.18.

Kinematic viscosity:

| 100° F. | 210° F. |
|---|---|
| 694.82 centistokes. | 18.79 centistokes. |
| ASTM slope | 0.87 |

A sample of 9.3214 grams was heated for five hours at 700° F. to test the thermal stability. A weight loss of 0.0643 gram (0.69 percent) was found. The compound showed a slight change in color after the heating; the refractive index was unchanged.

EXAMPLE VIII

*p-Bromophenyl m-ethylphenyl ether* p-Bromophenyl m-ethylphenyl ether was prepared from p-dibromobenzene (236 grams, 1.0 mole), m-ethylphenol (122 grams, 1.0 mole), and potassium hydroxide (65 grams of a commercial product with 86 percent KOH, 1.0 mole) in the same manner as described in Example III for the preparation of p-bromophenyl m-tolyl ether. A total of 126.3 grams of p-bromophenyl m-ethylphenyl ether, a colorless liquid (45.6 percent of the theoretical quantity), boiling at 189°–195° C. (12 mm. Hg), $n_D^{30}$:1.5863, was obtained.

EXAMPLE IX

*Bis-[4-(3'-ethylphenoxy)-phenyl]-diethylsilane* p-Bromophenyl m-ethylphenyl ether (110 grams, 0.4 mole) and diethyldichlorosilane (28.3 grams, 0.18 mole) were reacted with metallic sodium (18.4 grams, 0.8 gram atom) in the same way as described in Example II for the preparation of bis-(4-phenoxyphenyl)-diethylsilane. Fractional distillation of the reaction product gave 39.8 grams (46.0 percent of the theoretical quantity) of bis-[4-(3'-ethylphenoxy)-phenyl]-diethylsilane, a colorless liquid, boiling at 257°–260° C. at 0.3 mm Hg (corresponding to approx. 530° C. or 990° F. at normal pressure), $n_D^{26}$: 1.5885.

Calcd. for $C_{32}H_{36}SiO_2$: C, 79.96; H, 7.55; Si, 5.84. Found: C, 79.68; H, 7.77; Si, 5.76.

Kinematic viscosity:

| 100° F. | 210° F. |
|---|---|
| 169.65 centistokes. | 11.64 centistokes. |
| ASTM slope | 0.80 |

To test the thermal stability of the compound 8.9371 grams of bis-[4-(3'-ethylphenoxy)-phenyl]-diethylsilane was heated for five hours at 700° F. A weight loss of 0.0378 gram (0.42 percent) was found. The refractive index was unchanged after heating and only a very slight change in color was observed.

What is claimed is:

1. Bis-aryloxyphenyl-dialkylsilane of the general formula:

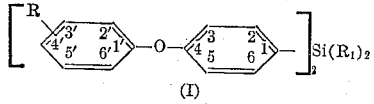

(I)

wherein $R_1$ and $R_2$ are alkyl radicals having from 1 to 5 carbon atoms.

2. Bis-[4-(3'-methylphenoxy)-phenyl]-dimethylsilane.
3. Bis-[4-(3'-methylphenoxy)-phenyl]-diethylsilane.
4. Bis-[4-(2'-methylphenoxy)-phenyl]-diethylsilane.
5. Bis-[4-(3'-ethylphenoxy)-phenyl]-diethylsilane.

References Cited in the file of this patent

UNITED STATES PATENTS

| 2,238,669 | Wiley | Apr. 15, 1941 |
| 2,386,452 | Fleming | Oct. 9, 1945 |
| 2,914,548 | Schroll | Nov. 24, 1959 |

OTHER REFERENCES

Oita et al.: "Jour. Org. Chem.," vol. 21 (1956), pp. 1009–12.

Gilman et al.: Ibid., vol. 22 (1957), pp. 45–7.

Gilman et al.: Journal Organic Chemistry, volume 23, pages 1363–1365, September 1958.